(12) United States Patent
Takiguchi

(10) Patent No.: US 10,313,678 B2
(45) Date of Patent: Jun. 4, 2019

(54) IMAGE SIGNAL PROCESSING APPARATUS AND DISPLAY DEVICE HAVING THE SAME

(71) Applicant: Samsung Display Co., Ltd., Yongin-si, Gyeonggi-do (KR)

(72) Inventor: Masahiko Takiguchi, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/861,478

(22) Filed: Jan. 3, 2018

(65) Prior Publication Data

US 2019/0014327 A1    Jan. 10, 2019

(30) Foreign Application Priority Data

Jul. 6, 2017    (KR) .................... 10-2017-0086132

(51) Int. Cl.
*H04N 19/172* (2014.01)
*H04N 19/184* (2014.01)
*H04N 19/182* (2014.01)

(52) U.S. Cl.
CPC ......... *H04N 19/172* (2014.11); *H04N 19/182* (2014.11); *H04N 19/184* (2014.11); *G09G 2320/02* (2013.01)

(58) Field of Classification Search
None
See application file for complete search history.

(56) References Cited

U.S. PATENT DOCUMENTS

| | | | | |
|---|---|---|---|---|
| 5,317,397 A * | 5/1994 | Odaka | ................. | H04N 19/105 348/699 |
| 5,986,710 A * | 11/1999 | Kim | .................... | H04N 19/176 375/240.2 |
| 6,148,109 A * | 11/2000 | Boon | ................... | H04N 19/619 375/E7.133 |
| 2002/0126759 A1* | 9/2002 | Peng | ..................... | H04N 19/105 375/240.16 |
| 2002/0164081 A1* | 11/2002 | Zhou | .................... | H04N 19/176 382/250 |
| 2005/0013357 A1* | 1/2005 | Cheong | ................ | H04N 19/176 375/240.01 |

(Continued)

FOREIGN PATENT DOCUMENTS

JP  4697965 B2  6/2011
JP  2015-104084 A  6/2015
KR  10-2015-0096217  8/2015

*Primary Examiner* — Nicholas J Lee
(74) *Attorney, Agent, or Firm* — Lewis Roca Rothgerber Christie LLP

(57) ABSTRACT

An image signal processing apparatus includes an adder to add an input data signal of a present frame to a cumulative data signal of a previous frame to output a cumulative data signal, an analyzing block to analyze a processing range of the cumulative data signal, a processing block to process the cumulative data signal based on the processing range to output a processed data signal, an encoding block to compress the processed data signal to output an encoded data signal, a memory to store the encoded data signal and the processing range, a decoding block to decode the encoded data signal read out from the memory to output a decoded data signal, and an inverse processing block to inversely process the decoded data signal based on the processing range to output an output data signal.

20 Claims, 12 Drawing Sheets

(56) References Cited

U.S. PATENT DOCUMENTS

| | | | |
|---|---|---|---|
| 2008/0111901 A1* | 5/2008 | Kawashima | G06T 5/002 |
| | | | 348/241 |
| 2015/0145879 A1 | 5/2015 | Nakayama | |
| 2015/0236714 A1 | 8/2015 | Jo | |
| 2017/0105005 A1* | 4/2017 | Chen | H04N 19/105 |

* cited by examiner

IMAGE SIGNAL PROCESSING APPARATUS AND DISPLAY DEVICE HAVING THE SAME

CROSS-REFERENCE TO RELATED APPLICATION

This application claims priority to and the benefit of Korean Patent Application No. 10-2017-0086132, filed on Jul. 6, 2017, the content of which is hereby incorporated by reference in its entirety.

BACKGROUND

1. Field

Embodiments of the present invention relate to an image signal processing apparatus capable of compressing an image signal and a display device having the image signal processing apparatus.

2. Description of the Related Art

Among flat panel display devices, an organic light emitting display device displays an image using an organic light emitting diode that emits a light using a recombination of an electron and a hole. In recent years, the organic light emitting display device is spotlighted because it has various features, such as fast response speed, low power consumption, high light emitting efficiency, high brightness, wide viewing angle, etc.

In a pixel of the organic light emitting display device, a light emitting degree of the organic light emitting diode is controlled by controlling a driving transistor that provides a driving current, according to a data voltage, to the organic light emitting diode.

In a case in which the organic light emitting display device is operated for a long time, a transistor in the pixel and/or the organic light emitting diode may deteriorate, and a display quality of the organic light emitting display device may be lowered.

SUMMARY

Aspects of embodiments of the present invention are directed toward an image signal processing apparatus capable of improving a display quality.

Aspects of embodiments of the present invention are directed toward a display device having the image signal processing apparatus.

An embodiment of the present invention provides an image signal processing apparatus including an adder to add an input data signal of a present frame to a cumulative data signal of a previous frame to output a cumulative data signal, an analyzing block to analyze a processing range of the cumulative data signal, a processing block to process the cumulative data signal based on the processing range to output a processed data signal, an encoding block to compress the processed data signal to output an encoded data signal, a memory to store the encoded data signal and the processing range, a decoding block to decode the encoded data signal read out from the memory to output a decoded data signal, and an inverse processing block to inversely process the decoded data signal based on the processing range to output an output data signal. The output data signal is provided to the adder as the cumulative data signal of the previous frame.

The processing range includes a valid most significant bit of the cumulative data signal.

The analyzing block is to detect the valid most significant bit of the cumulative data signal at every frame.

The analyzing block is to detect the valid most significant bit of the cumulative data signal at every set frame.

The processing block is to bit-shift the cumulative data signal in a first direction based on the valid most significant bit to output the processed data signal.

The processing block is to determine a number of bits, which is used to bit-shift the cumulative data signal in the first direction, depending on a difference between the number of bits of the cumulative data signal and the valid most significant bit.

The encoding block is to delete a lower k bits (k is a positive integer) of the processed data signal to output the encoded data signal.

The decoding block is to allow the lower k bits of the encoded data signal to be filled with 0s to output the decoded data signal.

The inverse processing block is configured to bit-shift the decoded data signal in a second direction opposite to the first direction to output the output data signal.

The processing block is to delete a portion of a data signal corresponding to a second pixel among first and second pixels when the valid most significant bit of the cumulative data signal is equal to or greater than a first critical value.

The processing block is to delete a whole portion of a data signal corresponding to a second pixel among first and second pixels when the valid most significant bit of the cumulative data signal is equal to or greater than a second critical value.

An embodiment of the present invention provides a display device including a display panel including a plurality of pixels, a power supply to provide a first power voltage and a second power voltage to the display panel, and a driving circuit to receive an input data signal and to provide an image data signal to the pixels such that an image is displayed through the pixels. The driving circuit includes an image signal processing apparatus to cumulate the image data signal provided to the pixels. The image signal processing apparatus includes an adder to add the input data signal of a present frame to a cumulative data signal of a previous frame to output a cumulative data signal, an analyzing block to analyze a processing range of the cumulative data signal, a processing block to process the cumulative data signal based on the processing range to output a processed data signal, an encoding block to compress the processed data signal to output an encoded data signal, a memory to store the encoded data signal and the processing range, a decoding block to decode the encoded data signal read out from the memory to output a decoded data signal, and an inverse processing block to inversely process the decoded data signal based on the processing range to output an output data signal. The output data signal is provided to the adder as the cumulative data signal of the previous frame.

The processing range includes a valid most significant bit of the cumulative data signal.

The processing block is to bit-shift the cumulative data signal in a first direction based on the valid most significant bit to output the processed data signal.

The inverse processing block is to bit-shift the decoded data signal in a second direction opposite to the first direction to output the output data signal.

The encoding block is to delete lower k bits (k is a positive integer) of the processed data signal to output the encoded data signal.

The decoding block is to allow the lower k bits of the encoded data signal to be filled with 0s to output the decoded data signal.

The processing block is to delete a portion of a data signal corresponding to a second pixel among first and second pixels when the valid most significant bit of the cumulative data signal is equal to or greater than a first critical value.

An embodiment of the present invention provides a method of operating an image signal processing apparatus including adding an input data signal of a present frame to a cumulative data signal of a previous frame, analyzing a processing range of the cumulative data signal, processing the cumulative data signal based on the processing range to output a processed data signal, compressing the processed data signal to output an encoded data signal, decoding the encoded data signal to output a decoded data signal, and inversely processing the decoded data signal based on the processing range to output an output data signal.

The processing range includes a valid most significant bit of the cumulative data signal.

According to the above, the image signal processing apparatus processes the image signal before compressing the image signal, and thus the loss of information of the restored image signal may be reduced or minimized. Accordingly, a display quality of the image displayed through the display device may be improved.

BRIEF DESCRIPTION OF THE DRAWINGS

The above and other features of embodiments of the present invention will become readily apparent by reference to the following detailed description when considered in conjunction with the accompanying drawings wherein.

DETAILED DESCRIPTION

Hereinafter, embodiments of the present invention will be explained in detail with reference to the accompanying drawings.

Figure 1:
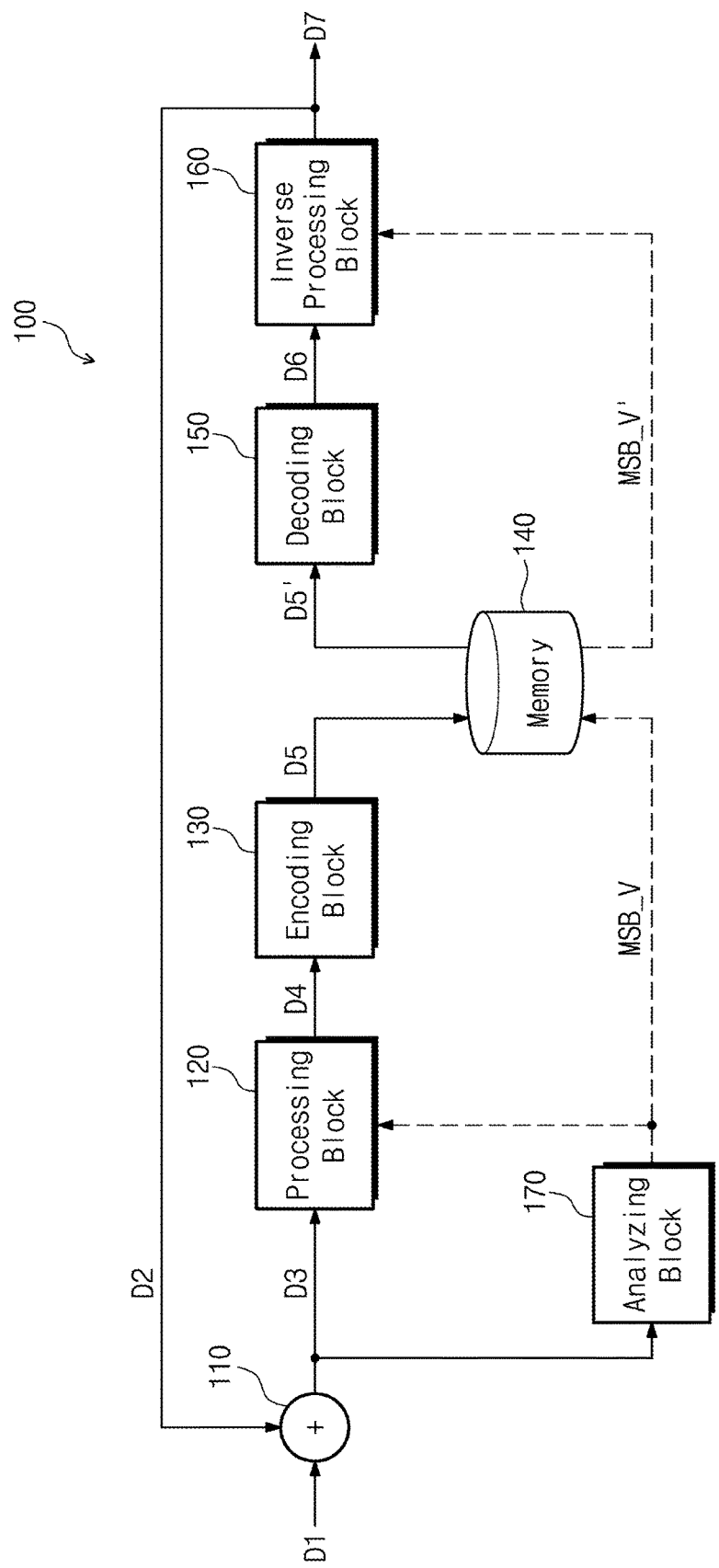
FIG. 1 is a block diagram showing an image signal processing apparatus according to an embodiment of the present invention.
Figure 2:
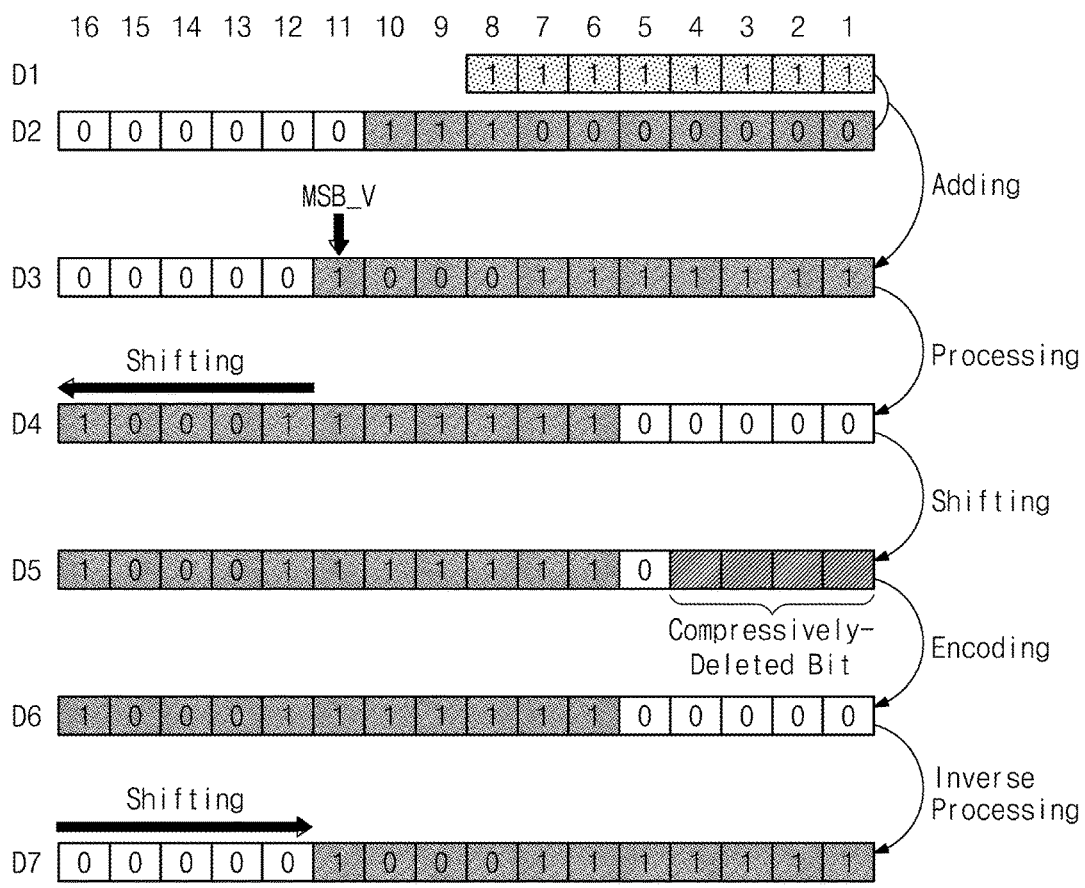
FIG. 2 is a view showing data signals respectively output from blocks of the image signal processing apparatus shown in FIG. 1.

FIG. 1 is a block diagram showing an image signal processing apparatus 100 according to an embodiment of the present invention. FIG. 2 is a view showing data signals respectively output from blocks of the image signal processing apparatus 100 shown in FIG. 1.

Referring to FIGS. 1 and 2, the image signal processing apparatus 100 includes an adder 110, a processing block 120, an encoding block 130, a memory 140, a decoding block 150, an inverse processing block 160, and an analyzing block 170.

The adder 110 adds an input data signal D1 of a present frame to a cumulative data signal D2 of a previous frame to output a cumulative data signal D3. The cumulative data signal D3 corresponds to a cumulative data signal of the present frame. In the embodiment shown in FIG. 2, the input data signal D1 has an 8-bit length (or an 8-bit width), the cumulative data signal D2 of the previous frame has a 16-bit length, and the cumulative data signal D3 has a 16-bit length, but they should not be limited thereto or thereby.

The analyzing block 170 detects a valid most significant bit MSB_V of the cumulative data signal D3. The 16 bits of the cumulative data signal D3 are initially filled with "0". The valid most significant bit MSB_V indicates a position of a first "1", i.e., a starting position of a valid data bit, except for the "0" of upper bits in the cumulative data signal D3. In the embodiment shown in FIG. 2, the valid most significant bit MSB_V of the cumulative data signal D3 corresponds to an eleventh bit from a least significant bit.

According to another embodiment, the valid most significant bit MSB_V may be a bit position in a desired range of a data signal that is to be processed by the processing block 120. For instance, the valid most significant bit MSB_V may be determined to have the 16-bit, which is a maximum bit length of the cumulative data signal D3 (according to the embodiment of FIG. 2), or a value smaller than the 16-bit. While the embodiment of FIG. 2 has a maximum length of 16 bits, the present invention is not limited thereto.

The analyzing block 170 may detect the valid most significant bit MSB_V with respect to each of cumulative data signals, which is to be processed, i.e., at every frame, or detect the valid most significant bit MSB_V of the cumulative data signal at every set, preset, or predetermined period, i.e., at every several frames. When the valid most significant bit MSB_V is detected with respect to each of the cumulative data signals, each of the cumulative data signals may be precisely processed, and a capacity of the memory 140 increases.

The valid most significant bit MSB_V output from the analyzing block 170 is stored in the memory 140 and provided to the processing block 120.

The processing block 120 processes the cumulative data signal D3 based on the valid most significant bit MSB_V from the adder 110. As the processing method for the data signal by the processing block 120, a bit shift method and a spatial information deletion method are used. In the embodiment shown in FIG. 2, the processing block 120 processes the cumulative data signal D3 using the bit shift method. The spatial information deletion method of the processing block 120 will be described in detail later.

The number of the bit shifts of the processing block 120 is determined depending on a difference between the number of bits of the cumulative data signal D3 and the valid most significant bit MSB_V.

The number of bit shifts=the number of cumulative
  data signal D3 bits–valid most significant bit
  MSB_V In the embodiment shown in FIG. 2, the number of the bit shifts of the processing block 120 is obtained by subtracting 11 bits from 16 bits, that is, the number of the bit shifts of the processing block 120 is 5 bits. The processing block 120 shifts the cumulative data signal D3 to the left by 5 bits and fills lower 5 bits with "0" to output a processed data signal D4.

The encoding block 130 receives the processed data signal D4 from the processing block 120. The encoding block 130 may irreversibly compress the processed data signal D4. In general, the irreversible compression is carried out by deleting a portion of the data signal, and thus a size of the data signal decreases. The irreversibly-compressed data signal may not be restored to match the original data signal, but may be compressed with a high compression ratio. In the embodiment shown in FIG. 2, the encoding block 130 outputs an encoded data signal D5 obtained by deleting lower 4 bits of the processed data signal D4. In the embodiment shown in FIG. 2, the encoded data signal D5 has a bit length of 12 bits shorter than the bit length, e.g., 16 bits, of the cumulative data signal D3. The encoded data signal D5 is stored in the memory 140.

The decoding block 150 reads out an encoded data signal D5' from the memory 140. In the embodiment shown in FIG. 2, the decoding block 150 performs a decoding process on the encoded data signal D5' such that lower 4 bits of the encoded data signal D5' are filled with "0" and outputs a decoded data signal D6. According to another embodiment, the decoding block 150 may perform the decoding process using an error diffusion method.

The inverse processing block 160 receives the decoded data signal D6 from the decoding block 150 and reads out valid most significant bit MSB_V' from the memory 140. The inverse processing block 160 may restore the decoded data signal D6 to an output data signal D7 using the bit shift method.

The number of the bit shifts of the inverse processing block 160 is determined depending on a difference between the number of bits of the decoded data signal D6 and the valid most significant bit MSB_V'.

The number of bit shifts=the number of decoded data signal D6 bits−valid most significant bit MSB_V'

In the embodiment shown in FIG. 2, the number of the bit shifts of the inverse processing block 160 is obtained by subtracting 11 bits from 16 bits, that is, the number of the bit shifts of the inverse processing block 160 is 5 bits. The inverse processing block 160 shifts the decoded data signal D6 to the right by 5 bits and fills the most significant 5 bits with "0" to output the output data signal D7. As shown in FIG. 2, the output data signal D7 may be restored to the original cumulative data signal D3.

The output data signal D7 may be provided to the adder 110 in a next frame as the cumulative data signal D2 of the previous frame.

Figure 3:
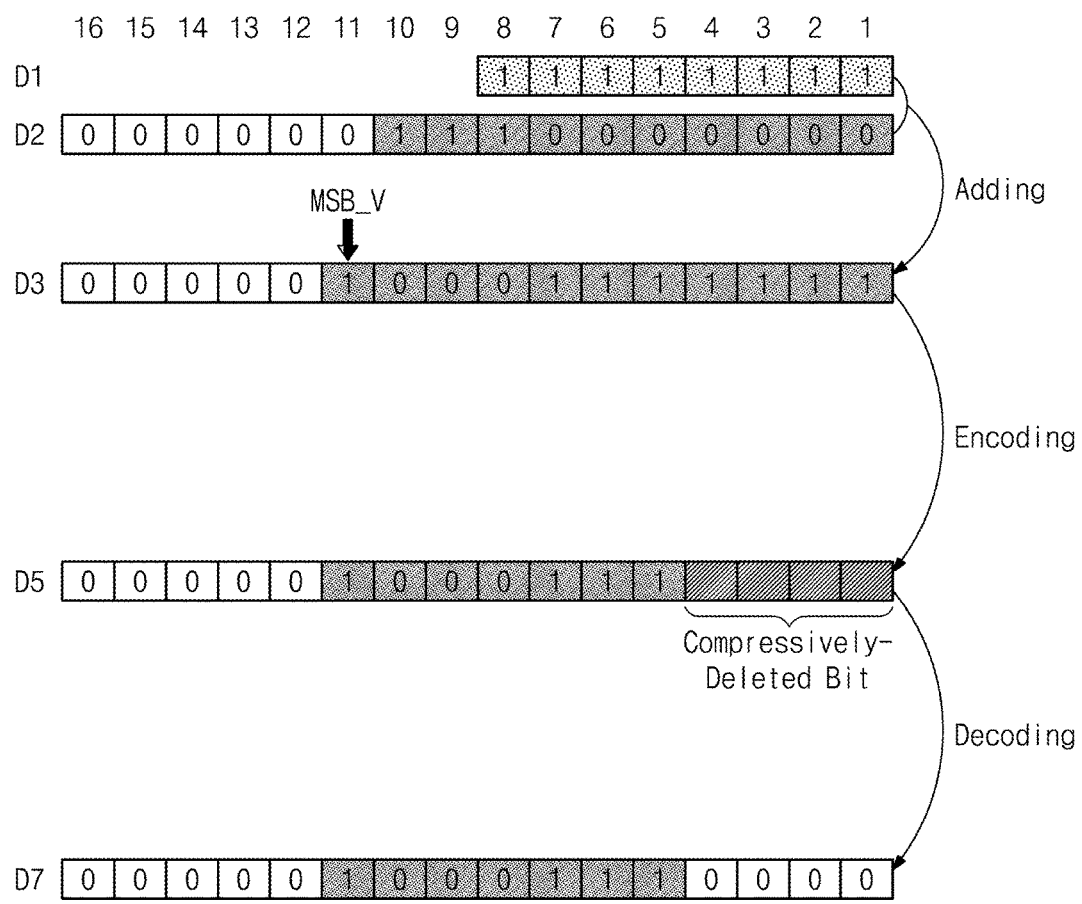
FIG. 3 is a view showing data signals respectively output from blocks of the image signal processing apparatus in a case in which a processing block and an inverse processing block of the image signal processing apparatus shown in FIG. 1 are not being operated.

FIG. 3 is a view showing data signals respectively output from blocks of the image signal processing apparatus 100 in a case in which the processing block 120 and the inverse processing block 160 of the image signal processing apparatus 100 shown in FIG. 1 are not operated.

Referring to FIGS. 1 and 3, in the case in which the processing block 120 is not operated, the cumulative data signal D3 may be directly provided to the encoding block 130.

The encoding block 130 outputs the encoded data signal D5 obtained by deleting lower 4 bits of the cumulative data signal D3 to compress the cumulative data signal D3.

The inverse processing block 160 performs a decoding process on the encoded data signal D5 such that the lower 4 bits of the encoded data signal D5 are filled with "0" and outputs the decoded data signal D6. Because there is lack of information about the 4 bits deleted by the encoding block 130, it is difficult to completely restore the output data signal D7 output from the inverse processing block 160 to the original cumulative data signal D3.

In the embodiment shown in FIG. 3, the cumulative data signal D3 and the output data signal D7 have different values from each other, and a difference between the cumulative data signal D3 and the output data signal D7 may increase as several frames are repeated.

Figure 4:
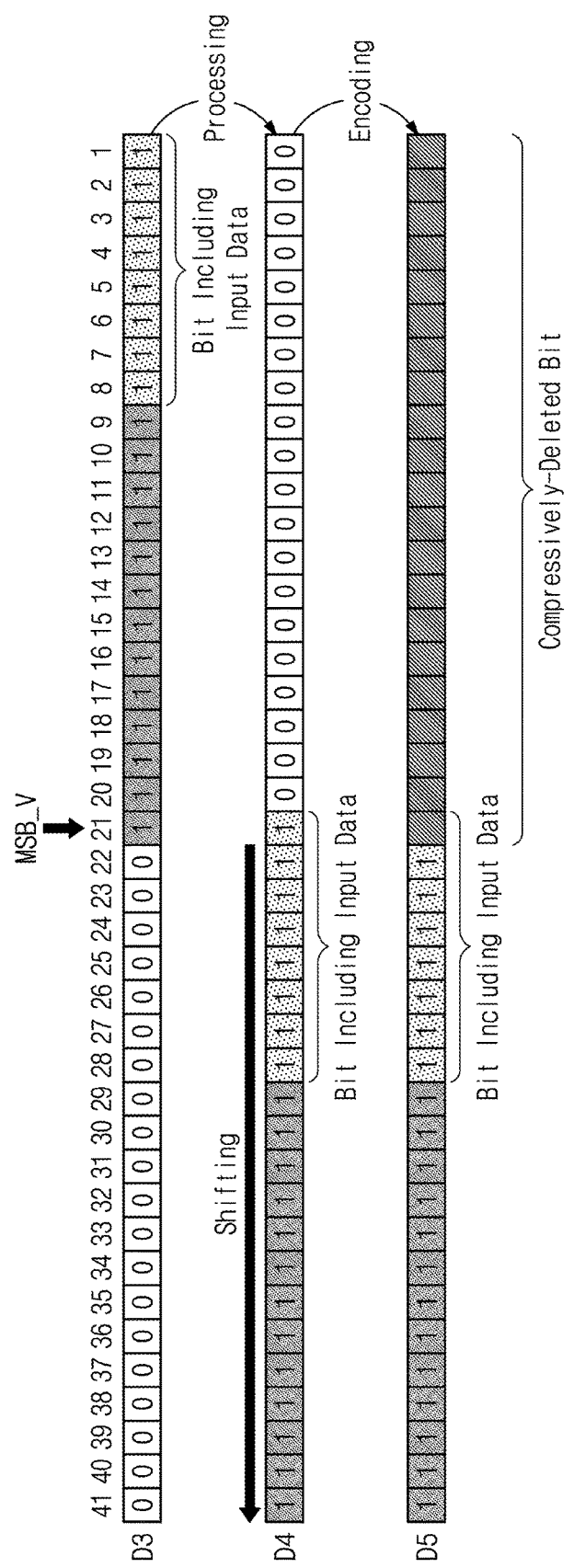
FIGS. 4 and 5 are views showing processed data signals output from the processing block shown in FIG. 1 and encoded data signals output from an encoding block shown in FIG. 1 in a case in which a cumulative data signal is 41 bits.
Figure 5:
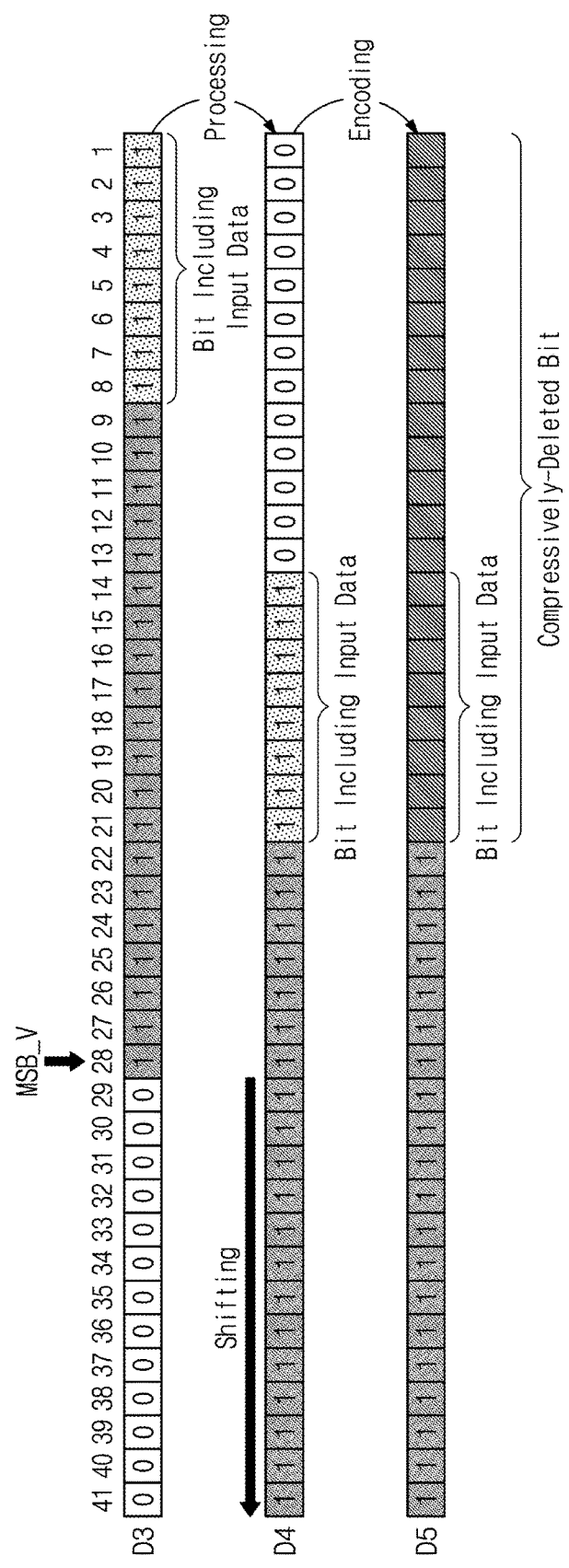

FIGS. 4 and 5 are views showing processed data signals output from the processing block 120 shown in FIG. 1 and encoded data signals output from the encoding block 130 shown in FIG. 1 in a case in which the cumulative data signal is 41 bits.

Referring to FIGS. 1 and 4, in order to operate a display device, which has 8 bits as a bit length of an input data signal corresponding to one pixel and an operating frequency of about 60 Hz and is operated 6 hours per a day, for ten years, the cumulative data signal D3 is to have a bit length of at least 41 bits.

As shown in FIG. 4, in a case in which the cumulative data signal D3 having the bit length of 41 bits is compressed to the encoded data signal D5 of 20 bits, bits including input data may be deleted when a twenty-first bit is the valid most significant bit MSB_V.

As shown in FIG. 5, in a case in which the cumulative data signal D3 having the bit length of 41 bits is compressed to the encoded data signal D5 of 20 bits, the encoded data signal D5 does not include even one bit of the input data signal when a twenty-eighth bit is the valid most significant bit MSB_V. That is, no new input data signal may be cumulated and compressed when the twenty-eighth bit is the valid most significant bit MSB_V of the cumulative data signal D3.

As the valid most significant bit MSB_V of the cumulative data signal D3 becomes a higher bit, a high frequency component of the encoded data signal D5 may be reduced. Accordingly, although the valid most significant bit MSB_V of the cumulative data signal D3 becomes the higher bit, a method that cumulates and compresses the new input data signal is required.

Figure 6:
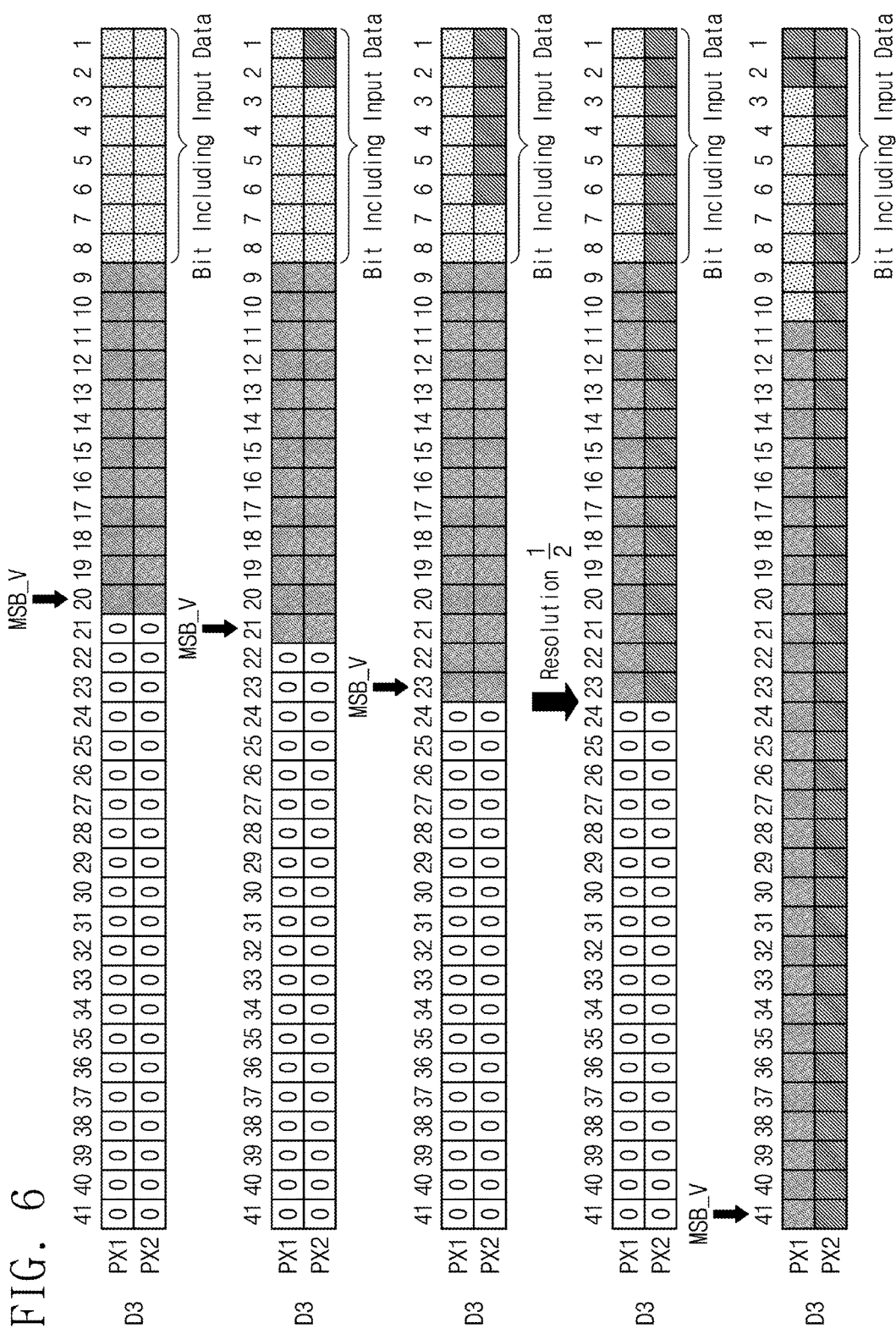
FIG. 6 is a view showing various examples of the cumulative data provided to the processing block shown in FIG. 1.

FIG. 6 is a view showing various examples of the cumulative data provided to the processing block 120 shown in FIG. 1.

Referring to FIGS. 1 and 6, in a case in which the cumulative data signal D3 having the bit length of 41 bits is compressed to the encoded data signal D5 of 20 bits by the processing block 120 and the encoding block 130, the cumulative data signal D3 may be normally converted to the encoded data signal D5 when a twentieth bit is the valid most significant bit MSB_V.

As described in FIG. 4, in the case in which the cumulative data signal D3 having the bit length of 41 bits is compressed to the encoded data signal D5 of 20 bits, bits including input data may be deleted when the twenty-first bit is the valid most significant bit MSB_V.

When the twenty-first bit is the valid most significant bit MSB_V of the cumulative data signal D3 having the bit length of 41 bits, the processing block 120 according to the embodiment of the present invention deletes lower 2 bits of a second pixel PX2 among cumulative data signals D3 of first and second pixels PX1 and PX2 adjacent to each other to generate the processed data signal D4. Because the lower 2 bits of the second pixel PX2 are deleted, lower bits of the first pixel PX1 are not deleted by the encoding block 130.

That is, the cumulative data signal D3 of the first pixel PX1 may be converted to the encoded data signal D5 without being deleted, and the cumulative data signal D3 of the second pixel PX2 may be converted to the encoded data signal D5 after deleting the lower 2 bits.

When a twenty-third bit is the valid most significant bit MSB_V of the cumulative data signal D3 having the bit length of 41 bits, the processing block 120 according to the embodiment of the present invention deletes lower 6 bits of the second pixel PX2 among the cumulative data signals D3 of the first and second pixels PX1 and PX2 adjacent to each other to generate the processed data signal D4. Because most of the cumulative data signals D3 of the second pixel PX2 are deleted, the processing block 120 deletes the cumulative data signal D3 of the second pixel PX2 by reducing the compression resolution to ½.

That is, the cumulative data signal D3 of the first pixel PX1 may be converted to the encoded data signal D5 without being deleted, and the cumulative data signal D3 with respect to the pixel PX2 may not be generated.

When the valid most significant bit MSB_V of the cumulative data signal D3 having the bit length of 41 bits is equal or substantially equal to or higher than the twenty-third bit, the processing block 120 deletes the lower 6 bits of the second pixel PX2 among the cumulative data signals D3 of the first and second pixels PX1 and PX2 adjacent to each other and converts only the cumulative data signal D3 of the first pixel PX1 to the processed data signal D4. Accordingly, when the valid most significant bit MSB_V of the cumulative data signal D3 having the bit length of 41 bits is a forty-first bit, only lower 2 bits of the cumulative data signal D3 of the first pixel PX1 may be deleted during the encoding process.

As described above, the encoded data signal D5 with respect to the second pixel PX2 partially or wholly deleted may be restored by the inverse processing block 160 using an image restoration method, such as a doubler or a scaler.

The spatial compression method shown in FIG. 6 is to explain an example of an operation of the processing block 120, but the operation of the processing block 120 should not be limited thereto or thereby.

The embodiments of the present invention provide the method of analyzing the cumulative data signal, which is to be compressed, the method of processing the input data signal based on the analyzed result before compression, and the method of analyzing and inversely processing the encoded data signal that is the compressed data signal, and thus a loss of the information may be reduced or minimized in the compression and restoration processes of the image data signal. Accordingly, the irreversible compression may be performed with a simple circuit configuration while maintaining a small memory size and the loss of information may be reduced. Further, the embodiments of the present invention may be used in combination with other suitable compression techniques.

Figure 7:
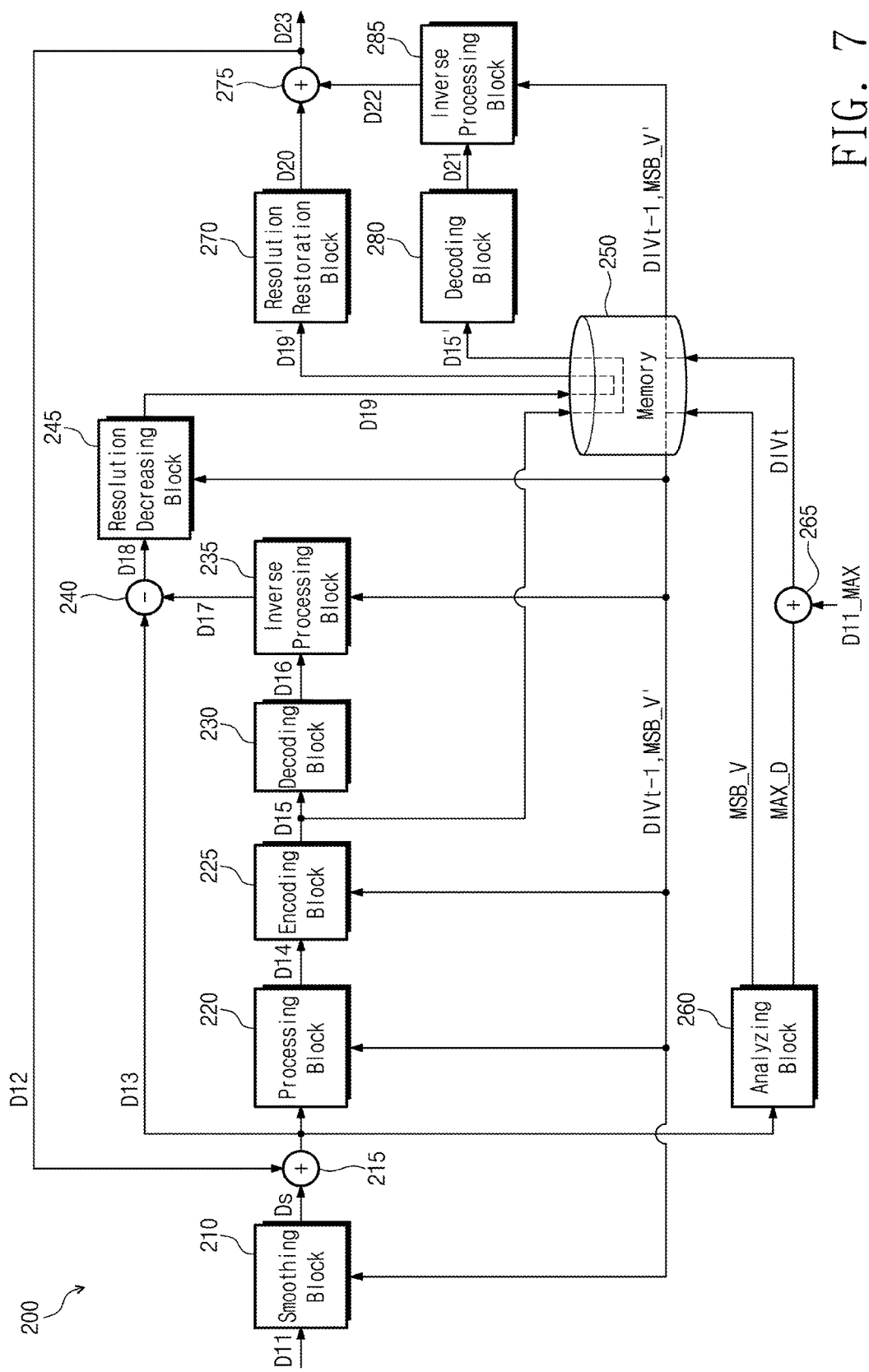
FIG. 7 is a block diagram showing an image signal processing apparatus according to another embodiment of the present invention.

FIG. 7 is a block diagram showing an image signal processing apparatus 200 according to another embodiment of the present invention. FIGS. 8 to 11 are views showing signals output from circuit blocks of the image signal processing apparatus 200 shown in FIG. 7.

Referring to FIG. 7, the image signal processing apparatus 200 includes a smoothing filter 210, adders 215, 265, and 275, a processing block 220, an encoding block 225, decoding blocks 230 and 280, inverse processing blocks 235 and 285, a subtractor 240, a resolution decreasing block 245, a memory 250, an analyzing block 260, and a resolution restoration block 270.

An input data signal D11 has an 8-bit length (or an 8-bit width) and a cumulative data signal D13 has a 41-bit length, but they should not be limited thereto or thereby.

The smoothing block 210 smooths the input data signal D11 in a spatial direction in accordance with a valid most significant bit MSB_V' from the memory 250. For instance, in a case in which the valid most significant bit MSB V' is a forty-first bit, the smoothing block 210 calculates an average value of input data signals D11 with respect to four pixels PX1 to PX4 adjacent to each other and outputs a smoothing data signal Ds. When the valid most significant bit MSB_V' is smaller than a set, preset, or predetermined value, the smoothing block 210 outputs the input data signal D11 as the smoothing data signal Ds without performing a smoothing operation.

The adder 215 adds the smoothing data signal Ds to a cumulative data signal D12 of a previous frame and outputs the cumulative data signal D13.

The analyzing block 260 detects a valid most significant bit MSB_V of the cumulative data signal D13 and a maximum value MAX_D of the cumulative data signal D13. The valid most significant bit MSB_V is stored in the memory 250. The adder 265 adds the maximum value MAX_D to a maximum value D11_MAX of the input data signal D11 and outputs a division value DIVt. For instance, in a case in which the input data signal D11 has 8 bits, the maximum value D11_MAX of the input data signal D11 is 255.

The processing block 220 receives the cumulative data signal D13 from the adder 215 and reads out a division value DIVt-1 and the valid most significant bit MSB_V' from the memory 250. The processing block 220 outputs a ratio data signal D14 obtained by dividing the cumulative data signal D13 by the division value DIVt-1. The ratio data signal D14 has a value between 0 and 1.

Figure 8:
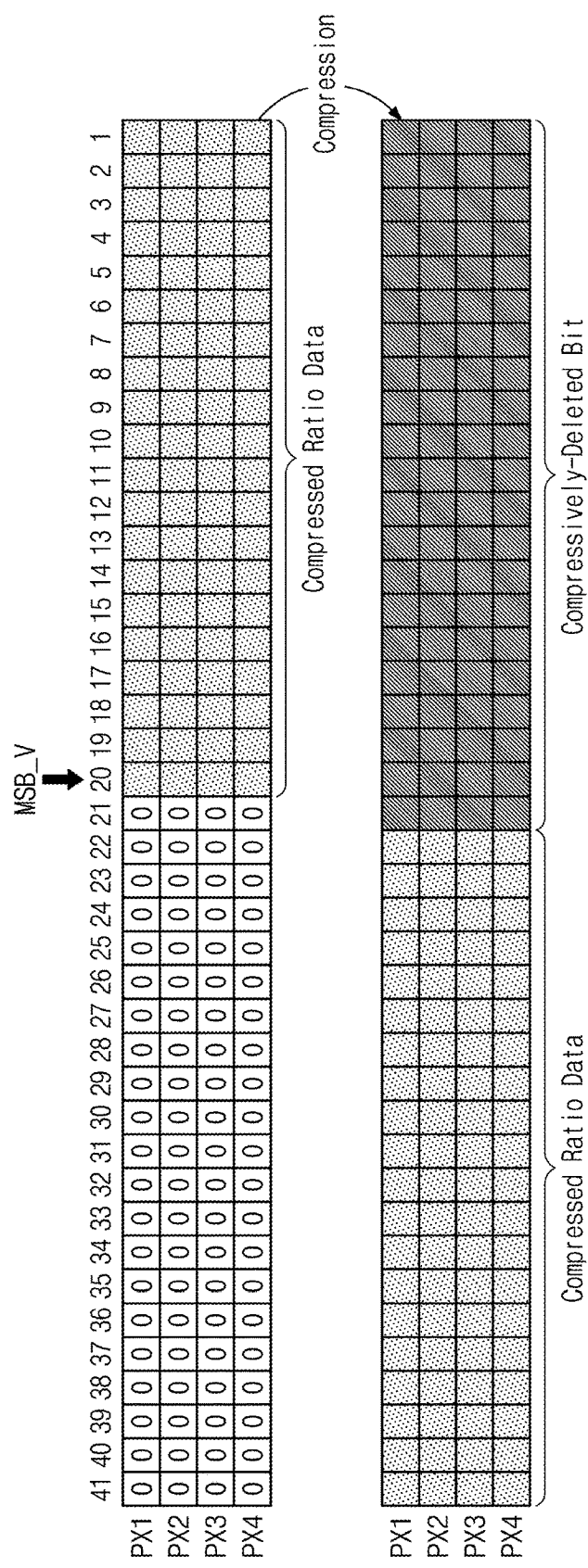
FIGS. 8 to 11 are views showing signals output from circuit blocks of the image signal processing apparatus shown in FIG. 7.

The encoding block 225 compresses the ratio data signal D14 according to the valid most significant bit MSB_V' and outputs a compressed ratio data signal D15. For instance, as shown in FIG. 8, in a case in which a twentieth bit is the valid most significant bit MSB_V', the encoding block 225 deletes lower 21 bits of the ratio data signal D14 such that the compressed ratio data signal D15 has the bit length of 20 bits.

Figure 11:
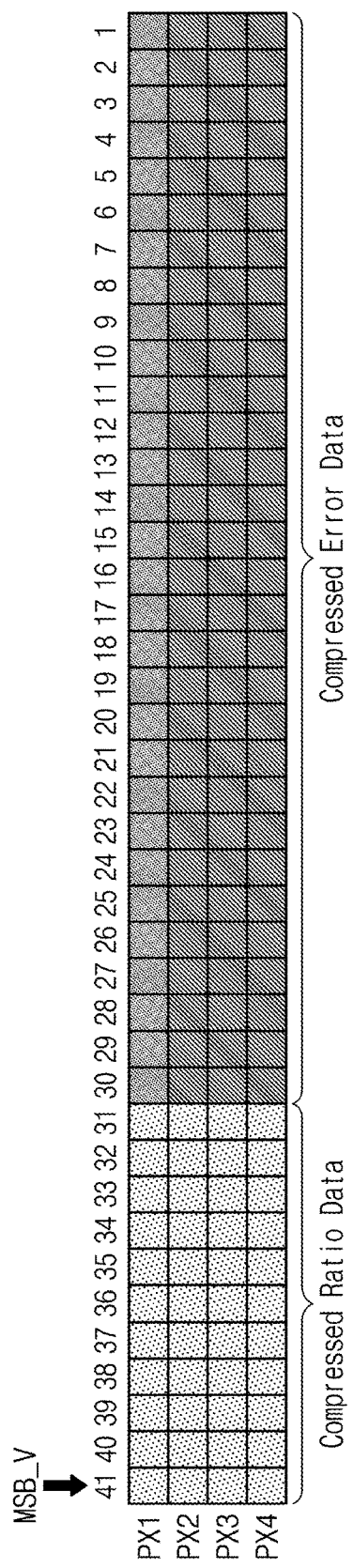

For instance, as shown in FIG. 11, in a case in which a forty-first bit is the valid most significant bit MSB_V', the encoding block 225 deletes lower 30 bits of the ratio data signal D14 such that the compressed ratio data signal D15 has the bit length of 11 bits.

According to another embodiment, the encoding block 225 may delete a set, preset, or predetermined lower bit (or number of lower bits) of the ratio data signal D14 regardless of the valid most significant bit MSB_V'.

The compressed ratio data signal D15 output from the encoding block 225 is stored in the memory 250.

The decoding block 230 receives the compressed ratio data signal D15 from the encoding block 225 and outputs a decoding ratio data signal D16. The inverse processing block 235 multiplies the decoding ratio data signal D16 by the division value DIVt-1 to output a decoding cumulative data signal D17. The subtractor 240 calculates a difference between the cumulative data signal D13 and the decoding cumulative data signal D17 and outputs a compressed error data signal D18.

The resolution decreasing block 245 decreases a resolution of the compressed error data signal D18 depending on the valid most significant bit MSB_V'.

As described in FIG. 6, in the case in which the cumulative data signal D13 having the bit length of 41 bits is compressed to the encoded data signal of 20 bits, the bits including the input data may be deleted when the twenty-first bit is the valid most significant bit MSB_V.

Figure 9:
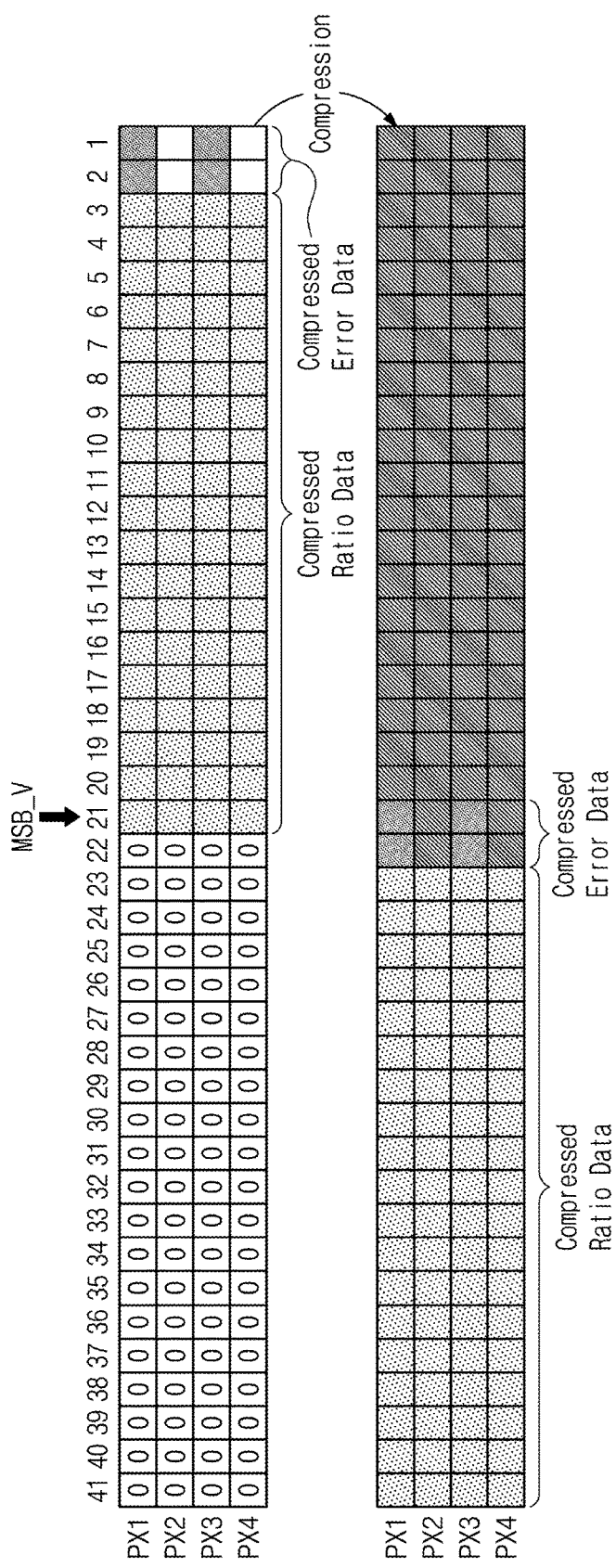

As shown in FIG. 9, when the twenty-first bit is the valid most significant bit MSB_V, the resolution decreasing block 245 maintains the compressed error data signal D18 corresponding to the first and third pixels PX1 and PX3 and deletes the compressed error data signal D18 corresponding to the second and fourth pixels PX2 and PX4. A decreased compression error signal D19 output from the resolution decreasing block 245 is stored in the memory 250.

Figure 10:
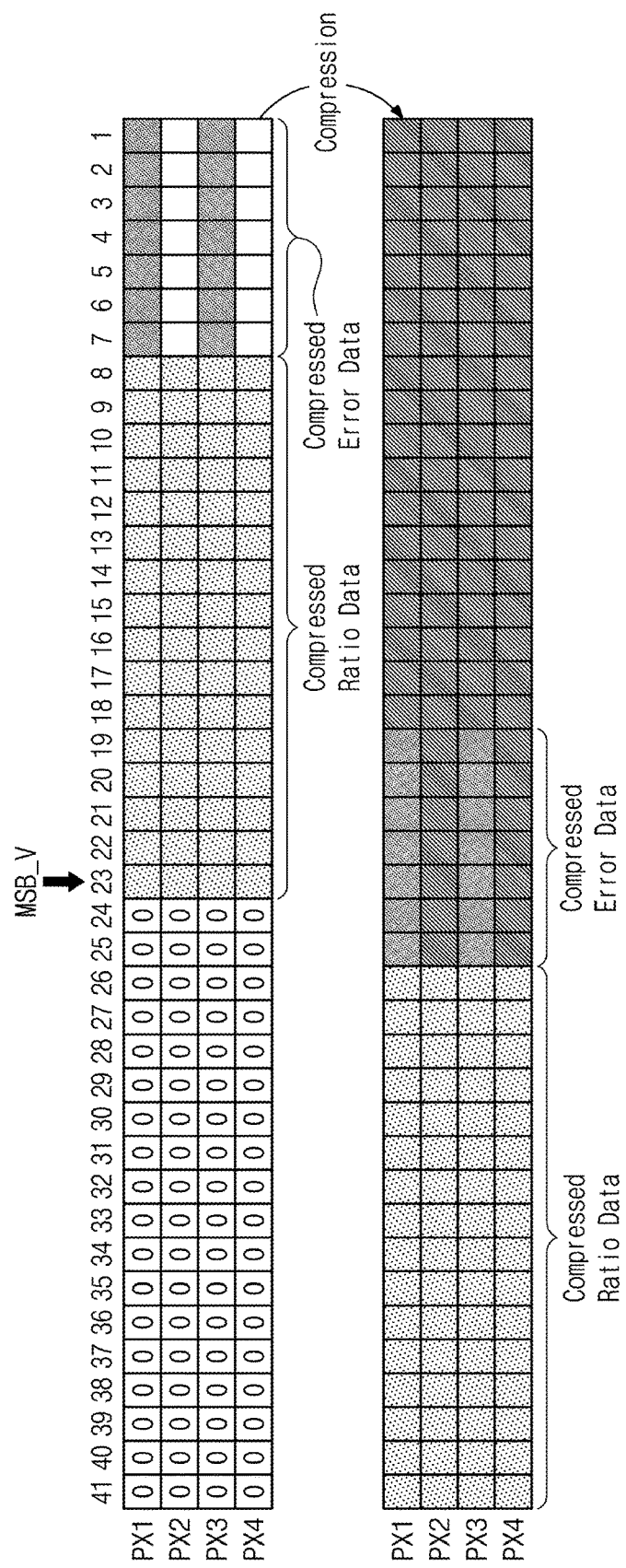

For instance, as shown in FIG. 10, when the twenty-third bit is the valid most significant bit MSB_V', the resolution decreasing block 245 maintains the compressed error data signal D18 corresponding to the first and third pixels PX1 and PX3 and deletes the compressed error data signal D18 corresponding to the second and fourth pixels PX2 and PX4. The decreased compression error signal D19 output from the resolution decreasing block 245 is stored in the memory 250.

For instance, as shown in FIG. 11, when the forty-first bit is the valid most significant bit MSB_V', the compressed error data signal D18 corresponding to the first pixel PX1 is maintained, and the compressed error data signal D18 corresponding to the second to fourth pixels PX2 to PX4 is deleted. The decreased compression error signal D19 output from the resolution decreasing block 245 is stored in the memory 250.

The resolution restoration block 270 restores a decreased compression error data signal D19' from the memory 250. The resolution restoration block 270 restores the decreased compression error data signal D19' using the image restoration method, such as the doubler or the scaler and outputs an extended compression error data signal D20.

The decoding block 280 reads out the compressed ratio data signal D15' from the memory 250. The decoding block 280 decodes the compressed ratio data signal D15' and outputs a decoding ratio data signal D21. The decoding ratio data signal D21 output from the decoding block 280 may be substantially the same as the decoding ratio data signal D21 output from the decoding block 230.

The inverse processing block 285 restores the decoding ratio data signal D21 to an output data signal D23 based on the valid most significant bit MSB_V' read-out from the memory using the bit shift method.

The output data signal D23 may be provided to the adder 215 in the next frame as the cumulative data signal D12 of the previous frame. The output data signal D23 may include an error caused by compression and an error caused by decreasing the spatial resolution. When the valid most significant bit MSB_V is small (e.g., when the twentieth bit or less is the valid most significant bit MSB_V), the error is not included in the output data signal D23, but the error included in the output data signal D23 increases as the valid most significant bit MSB_V has higher values. However, as the valid most significant bit MSB_V has higher values, the high frequency component of the cumulative data signal D13 decreases, and thus the loss of information, which is caused by the compression, may be reduced. In addition, because the spatial resolution of the higher bits of the cumulative data signal D13 is not reduced, a phenomenon in which the spatial resolution is rapidly decreased to half (½) as shown in FIG. 6 does not occur.

The embodiments of the present invention show methods of cumulating the data signal by sacrificing the spatial information, but the data signal may be cumulated using a temporal margin in a case in which the input data signal is a motion picture. For instance, because image signals of 60 frames are input per second in a case in which the motion picture is provided at 60 Hz, a change in 1/60 second is minor. Accordingly, the deletion amount of the spatial information may be controlled by a combination of the method of cumulating only one frame of every two frames and the method of deleting one bit.

Figure 12:
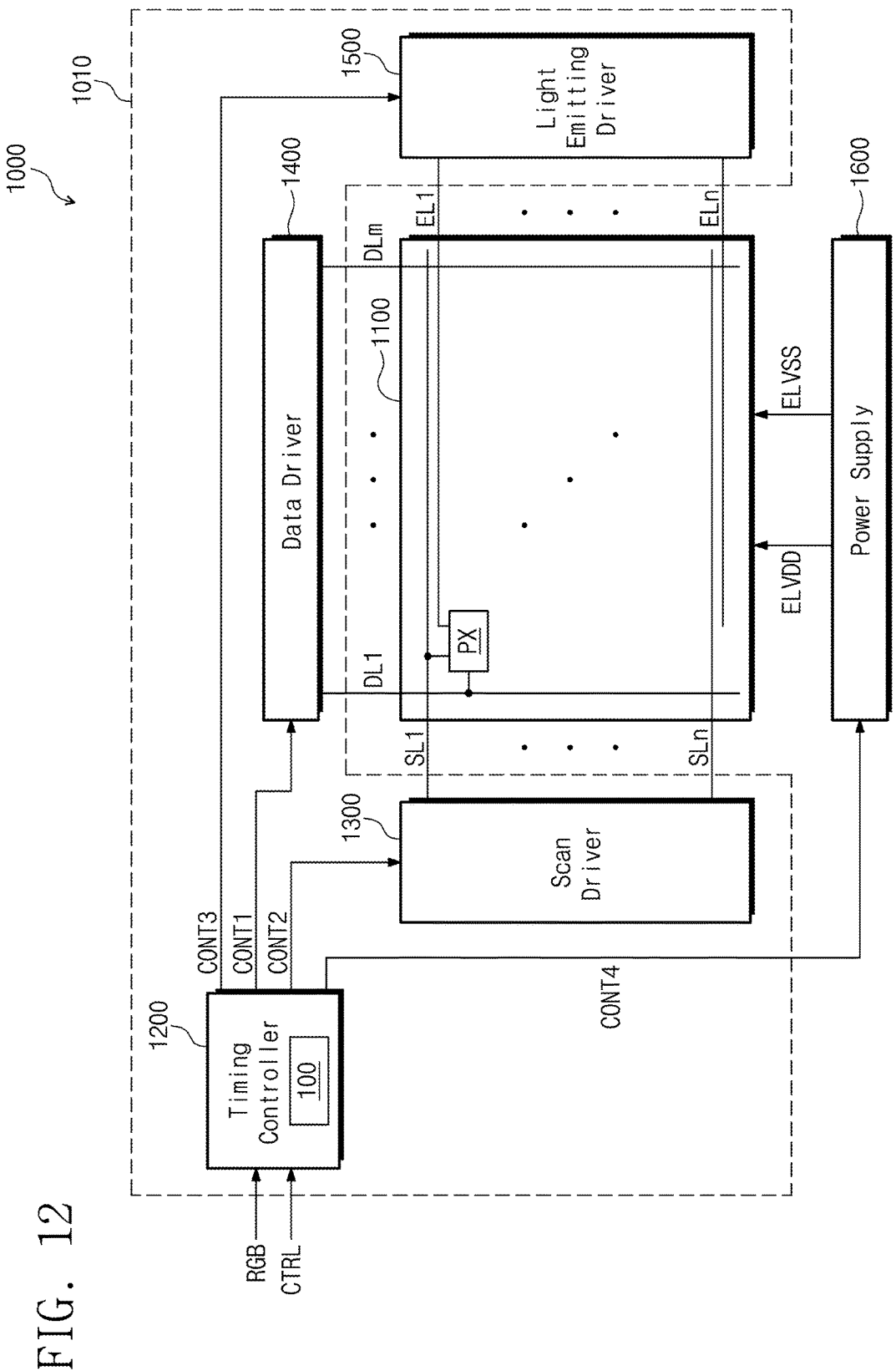
FIG. 12 is a block diagram showing a display device according to an embodiment of the present invention.

FIG. 12 is a block diagram showing a display device 1000 according to an embodiment of the present invention.

Referring to FIG. 12, the display device 1000 includes a display panel 1100, a driving circuit 1010, and a power supply 1600. The driving circuit 1010 includes a timing controller 1200, a scan driver 1300, a data driver 1400, and a light emitting driver 1500. The timing controller 1200, the scan driver 1300, the data driver 1400, and the light emitting driver 1500 are connected to the display panel 1100 in a chip-on-flexible printed circuit (COF), a chip-on-glass (COG), or a flexible printed circuit (FPC) manner.

The display panel 1100 includes a plurality of data lines DL1 to DLm (m is a natural number equal to or greater than 2), a plurality of scan lines SL1 to SLn (n is a natural number equal to or greater than 2) arranged to cross the data lines DL1 to DLm, a plurality of light emitting control lines EL1 to ELn arranged substantially parallel to the scan lines SL1 to SLn, and a plurality of pixels PX respectively arranged in areas defined by the data lines DL1 to DLm, the scan lines SL1 to SLn, and the light emitting control lines EL1 to ELn. The data lines DL1 to DLm, the scan lines SL1 to SLn, and the light emitting control lines EL1 to ELn are insulated from each other.

Each of the pixels PX includes a switching transistor connected to a corresponding data line, a corresponding scan line, and a corresponding light emitting control line, a driving transistor, and an organic light emitting element.

The timing controller 1200 receives an input data signal RGB and a control signal CTRL from an external source. The timing controller 1200 generates first, second, third, and fourth driving control signals CONT1, CONT2, CONT3, and CONT4. The first driving control signal CONT1 is applied to the data driver 1400, the second driving control signal CONT2 is applied to the scan driver 1300, the third driving control signal CONT3 is applied to the light emitting driver 1500, and the fourth driving control signal CONT4 is applied to the power supply 1600. The first driving control signal CONT1 includes various signals, e.g., a start pulse signal, a sampling clock signal, a polarity control signal, an output enable signal, etc., to control the drive of the data driver 1400. The second driving control signal CONT2 includes various signals, e.g., a gate start pulse signal, a shift clock signal, a gate output enable signal, etc., to control the drive of the scan driver 1300.

The scan driver 1300 respectively applies scan signals to the pixels PX in response to the second driving control signal CONT2 through the scan lines SL1 to SLn.

The data driver 1400 respectively applies data voltages to the pixels PX in response to the first driving control signal CONT1 through the data lines DL1 to DLm.

The light emitting driver 1500 respectively applies light emitting control signals to the pixels PX in response to the third driving control signal CONT3 through the light emitting control lines EL1 to ELn. A brightness of the display panel 1100 may be controlled on the basis of the light emitting control signals.

The power supply 1600 supplies a first power voltage ELVDD and a second power voltage ELVSS to the display panel 1100 in response to the fourth driving control signal CONT4.

The organic light emitting element in the pixel PX may deteriorate during long-term operation. For instance, an image displayed through the display panel 1100 during the previous frame may remain as an afterimage on an image displayed through the display panel 1100 during the present frame. To prevent or reduce the deterioration of the pixel PX, the timing controller 1200 may include the image signal processing apparatus 100 that cumulates the image data signal provided to the display panel 1100 to predict a degree of deterioration of the pixel PX. The image signal processing apparatus 100 may include the configurations shown in FIG. 1.

The image signal processing apparatus 100 provides the method of analyzing the cumulative data signal, which is to be compressed, processing the input data signal based on the analyzed result before compression, and analyzing and inversely processing the encoded data signal that is the compressed data signal, and thus a loss of the information may be reduced or minimized in the compression and restoration processes of the image data signal. Accordingly, the irreversible compression may be performed with a simple circuit configuration while maintaining a small memory size and the loss of information may be reduced. Further, the embodiments of the present invention may be used in combination with other suitable compression techniques.

It will be understood that, although the terms "first," "second," "third," etc., may be used herein to describe various elements, components, regions, layers, and/or sections, these elements, components, regions layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

A relevant device or component (or relevant devices or components) according to embodiments of the present invention described herein may be implemented utilizing any suitable hardware (e.g., an application-specific integrated circuit), firmware (e.g., a DSP or FPGA), software, or a suitable combination of software, firmware, and hardware. For example, the various components of the relevant device(s) may be formed on one integrated circuit (IC) chip or on separate IC chips. Further, the various components of the relevant device(s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Furthermore, "connection," "connected," etc., may also refer to "electrical connection," "electrically connected," etc., depending on the context in which such terms are used as would be understood by those skilled in the art. When an element or layer is referred to as being "directly on," "directly connected to," "directly coupled to," "directly connected with," "directly coupled with," or "immediately adjacent to" another element or layer, there are no intervening elements or layers present.

As used herein, "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. An image signal processing apparatus comprising:
   an adder to add an input data signal of a present frame to a cumulative data signal of a previous frame to output a cumulative data signal;
   an analyzing block to analyze a processing range of the cumulative data signal;
   a processing block to process the cumulative data signal based on the processing range to output a processed data signal;
   an encoding block to compress the processed data signal to output an encoded data signal;
   a memory to store the encoded data signal and the processing range;
   a decoding block to decode the encoded data signal read out from the memory to output a decoded data signal; and
   an inverse processing block to inversely process the decoded data signal based on the processing range to output an output data signal, wherein the output data signal is provided to the adder as the cumulative data signal of the previous frame.

2. The image signal processing apparatus of claim 1, wherein the processing range comprises a valid most significant bit of the cumulative data signal.

3. The image signal processing apparatus of claim 2, wherein the analyzing block is to detect the valid most significant bit of the cumulative data signal at every frame.

4. The image signal processing apparatus of claim 2, wherein the analyzing block is to detect the valid most significant bit of the cumulative data signal at every set frame.

5. The image signal processing apparatus of claim 2, wherein the processing block is to bit-shift the cumulative data signal in a first direction based on the valid most significant bit to output the processed data signal.

6. The image signal processing apparatus of claim 5, wherein the processing block is to determine a number of bits, which is used to bit-shift the cumulative data signal in the first direction, depending on a difference between the number of bits of the cumulative data signal and the valid most significant bit.

7. The image signal processing apparatus of claim 5, wherein the encoding block is to delete a lower k bits (k is a positive integer) of the processed data signal to output the encoded data signal.

8. The image signal processing apparatus of claim 7, wherein the decoding block is to allow the lower k bits of the encoded data signal to be filled with 0s to output the decoded data signal.

9. The image signal processing apparatus of claim 5, wherein the inverse processing block is to bit-shift the decoded data signal in a second direction opposite to the first direction to output the output data signal.

10. The image signal processing apparatus of claim 2, wherein the processing block is to delete a portion of a data signal corresponding to a second pixel among first and second pixels when the valid most significant bit of the cumulative data signal is equal to or greater than a first critical value.

11. The image signal processing apparatus of claim 2, wherein the processing block is to delete a whole portion of a data signal corresponding to a second pixel among first and second pixels when the valid most significant bit of the cumulative data signal is equal to or greater than a second critical value.

12. A display device comprising:
    a display panel comprising a plurality of pixels;
    a power supply to provide a first power voltage and a second power voltage to the display panel; and
    a driving circuit to receive an input data signal and to provide an image data signal to the pixels such that an image is displayed through the pixels, the driving circuit comprising an image signal processing apparatus to cumulate the image data signal provided to the pixels, the image signal processing apparatus comprising:
       an adder to add the input data signal of a present frame to a cumulative data signal of a previous frame to output a cumulative data signal;
       an analyzing block to analyze a processing range of the cumulative data signal;
       a processing block to process the cumulative data signal based on the processing range to output a processed data signal;
       an encoding block to compress the processed data signal to output an encoded data signal;
       a memory to store the encoded data signal and the processing range;
       a decoding block to decode the encoded data signal read out from the memory to output a decoded data signal; and
       an inverse processing block to inversely process the decoded data signal based on the processing range to output an output data signal, wherein the output data signal is provided to the adder as the cumulative data signal of the previous frame.

13. The display device of claim 12, wherein the processing range comprises a valid most significant bit of the cumulative data signal.

14. The display device of claim 13, wherein the processing block is configured to bit-shift the cumulative data signal in a first direction based on the valid most significant bit to output the processed data signal.

15. The display device of claim 14, wherein the inverse processing block is to bit-shift the decoded data signal in a second direction opposite to the first direction to output the output data signal.

16. The display device of claim 13, wherein the encoding block is to delete a lower k bits (k is a positive integer) of the processed data signal to output the encoded data signal.

17. The display device of claim 16, wherein the decoding block is to allow the lower k bits of the encoded data signal to be filled with 0s to output the decoded data signal.

18. The display device of claim 13, wherein the processing block is to delete a portion of a data signal corresponding to a second pixel among first and second pixels when the valid most significant bit of the cumulative data signal is equal to or greater than a first critical value.

19. A method of operating an image signal processing apparatus, the method comprising:
- adding an input data signal of a present frame to a cumulative data signal of a previous frame;
- analyzing a processing range of the cumulative data signal;
- processing the cumulative data signal based on the processing range to output a processed data signal;
- compressing the processed data signal to output an encoded data signal;
- decoding the encoded data signal to output a decoded data signal; and
- inversely processing the decoded data signal based on the processing range to output an output data signal.

20. The method of claim 19, wherein the processing range comprises a valid most significant bit of the cumulative data signal.

* * * * *